US010576784B2

(12) United States Patent
Bruschelli et al.

(10) Patent No.: US 10,576,784 B2
(45) Date of Patent: Mar. 3, 2020

(54) TYRE FOR MOTORCYCLES

(71) Applicant: PIRELLI TYRE S.P.A., Milan (IT)

(72) Inventors: Luca Bruschelli, Milan (IT); Francesco Gagliardi, Milan (IT); Mario Mariani, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 347 days.

(21) Appl. No.: 15/107,006

(22) PCT Filed: Dec. 11, 2014

(86) PCT No.: PCT/IB2014/066791
§ 371 (c)(1),
(2) Date: Jun. 21, 2016

(87) PCT Pub. No.: WO2015/097582
PCT Pub. Date: Jul. 2, 2015

(65) Prior Publication Data
US 2016/0332485 A1 Nov. 17, 2016

(30) Foreign Application Priority Data
Dec. 23, 2013 (IT) .............................. MI2013A2204

(51) Int. Cl.
*B60C 11/00* (2006.01)
*B60C 1/00* (2006.01)
(Continued)

(52) U.S. Cl.
CPC .......... *B60C 1/0016* (2013.01); *B60C 9/0042* (2013.01); *B60C 11/0083* (2013.01);
(Continued)

(58) Field of Classification Search
CPC ............. B60C 2200/10; B60C 11/0083; B60C 1/0016; B60C 9/0042; B60C 2009/0078; B60C 2009/0433
See application file for complete search history.

(56) References Cited

U.S. PATENT DOCUMENTS 7,658,216 B2   2/2010   Valle et al.
8,011,403 B2   9/2011   Nakagawa
(Continued)

FOREIGN PATENT DOCUMENTS

EP   1 955 873   8/2008
EP   1 987 963   11/2008
(Continued)

OTHER PUBLICATIONS

International Search Report from the European Patent Office for International Application No. PCT/IB2015/066791, dated Mar. 31, 2015.
(Continued)

*Primary Examiner* — Robert C Dye
*Assistant Examiner* — Cedrick S Williams
(74) *Attorney, Agent, or Firm* — Finnegan, Henderson, Farabow, Garrett & Dunner LLP (57) ABSTRACT

A tyre for motor vehicles, includes: a carcass structure; a belt structure applied in a position radially external to the carcass structure and a tread band; the tyre having a transverse curvature ratio of at least about 0.30, the carcass structure including at least one carcass layer including textile reinforcement elements obtained by means of cords having, in a load/elongation diagram, an elastic response of at least 55 N at an elongation of about 2%; and at least one tread portion comprising a cured elastomeric material obtained by curing an elastomeric compound including 100 phr of at least one elastomeric polymer, from 30 to 130 phr of at least one
(Continued)

reinforcement filler including at least 60% of an inorganic material selected from among silica, alumina, silicates, hydrotalcite, calcium carbonate, kaolin, titanium dioxide and their mixtures, and from 1 to 35 phr of at least one resin.

15 Claims, 3 Drawing Sheets

(51) Int. Cl.
*B60C 9/00* (2006.01)
*B60C 9/04* (2006.01)

(52) U.S. Cl.
CPC .............. *B60C 2009/0078* (2013.01); *B60C 2009/0433* (2013.01); *B60C 2200/10* (2013.01)

(56) References Cited

U.S. PATENT DOCUMENTS

| | | |
|---|---|---|
| 2008/0271830 A1 | 11/2008 | Suzuki |
| 2009/0266462 A1 | 10/2009 | Yamamoto et al. |
| 2009/0308515 A1* | 12/2009 | Matsunaga ......... B60C 11/0302 152/209.18 |
| 2010/0224302 A1 | 9/2010 | Fukumoto |
| 2012/0041098 A1 | 2/2012 | Lopitaux et al. |
| 2012/0118467 A1* | 5/2012 | Bruschelli ............ B60C 9/0042 152/556 |
| 2012/0267029 A1 | 10/2012 | Rampana et al. |
| 2013/0299054 A1* | 11/2013 | Kajimoto .............. B60C 11/005 152/209.18 |
| 2013/0331480 A1* | 12/2013 | Suzuki ................. B60C 1/0016 523/156 |
| 2016/0319115 A1* | 11/2016 | Abad ................... B60C 1/0016 |

FOREIGN PATENT DOCUMENTS

| | | |
|---|---|---|
| EP | 2 186 652 | 5/2010 |
| JP | 2002036812 A * | 2/2002 ......... B60C 11/0083 |
| JP | 2008162354 A * | 7/2008 |
| JP | 2009-166519 A | 7/2009 |
| JP | 2012-136659 A | 7/2012 |
| WO | WO 2011/012944 | 2/2011 |
| WO | WO 2011/012980 | 2/2011 |
| WO | WO 2011/077346 | 6/2011 |
| WO | WO-2011080566 A1 * | 7/2011 ......... B60C 11/0302 |
| WO | WO 2012/052328 | 4/2012 |
| WO | WO 2012/164436 | 12/2012 |
| WO | WO 2013/021271 | 2/2013 |
| WO | WO-2013-172699 | 11/2013 |

OTHER PUBLICATIONS

Written Opinion of the International Searching Authority from the European Patent Office for International Application No. PCT/IB2015/066791, dated Mar. 31, 2015.

"Pressure, temperature, force, and contact surface: the secrets of racing tyres"; article issued on www.BoxRepsol.com (2 pgs.). https://www.boxrepsol.com/en/motogp-en/pressure-temperature-force-and-contact-surface-the-secrets-of-racing-tyres/.

"Get the Ultimate Grip on Winter Driving With the Michelin® X-ICE® X13™"; article issued on www.michelinmedia.com; posted Jan. 24, 2012 (3 pgs.). https://michelinmedia.com/c0/ultimate-grip-winter-driving-michelin-x-ice-xi3/.

"This Is How the Winter Tyre Has Changed—Comparing the World's First Winter Tyre to the State-of-the-Art Non-Studded Winter Tyre"; article issued in www.nokiatyres.com (5 pgs.). https://www.nokiantyres.com/company/about-us/history/over-80-years-since-the-invention-of-the-winter-tyre/this-is-how-the-winter-tyre-has-changed/.

"Bridgestone's Blizzak tire: The secret is in the rubber"; article issued on www.guideautoweb.com; posted Jan. 31, 2010 (3 pgs.). https://www.guideautoweb.com/en/articles/6872/bridgestone-s-blizzak-tires-the-secret-is-in-the-rubber/.

"Can You Drive Snow and Winter Tires Year Round?"; article issued on www.bridgestonetire.com (2 pgs.). https://www.bridgestonetire.com/tread-and-trend/drivers-ed/driving-winter-tires-year-round.

"Difference between winter and summer tyres"; article issued on www.michelin.ie (2 pgs.). https://www.michelin.ie/winter/difference-between-winter-tyres-summer-tyres.

\* cited by examiner

TYRE FOR MOTORCYCLES

CROSS REFERENCE TO RELATED APPLICATIONS

This application is a national phase application based on PCT/IB2014/066791, filed Dec. 11, 2014, which claims the priority of Italian Patent Application No. MI2013A002204, filed Dec. 23, 2013, the content of each application being incorporated herein by reference.

FIELD OF THE INVENTION

The present invention refers to tyres for motor vehicle wheels.

In particular, the present invention refers to high performance tyres for motor vehicle wheels, in other words tyres capable of sustaining maximum speeds of at least about 210 km/h or supporting maximum loads of at least about 210 kg or a combination of both. Preferably the present invention refers to tyres intended to be mounted on the wheels of "super sport" motor vehicles with large-displacement engines (for example 600 $cm^3$ or greater), and/or high power (for example 100-120 horsepower or greater) useable both on the road and on racetracks.

STATE OF THE ART

Tyres for two-wheeled high performance vehicles adapted for sport use are for example described in the patent applications WO2011012944, WO2011012980, WO2012164436, WO2013021271 on behalf of the Applicant; tyres and compounds for tyres for two-wheeled vehicles are also described in U.S. Pat. Nos. 7,658,216, 8,011,403 and WO2013172699.

SUMMARY OF THE INVENTION

Recently, there has been a trend towards introducing motor vehicles for "super sport" use on the market that have increasingly high power. Indeed, super sport motor vehicles are already present on the market that have 1000 $cm^3$ displacement, with over 180 horsepower power.

The Applicant has observed an increasing need to use such super sport vehicles, both on roads and on racetracks.

At the same time, the Applicant has observed an increasing request for high performing tyres both for demanding sport driving (e.g. achievable on a racetrack) and in terms of lifetime and driving in any atmospheric and seasonal condition (for road uses of the motor vehicle throughout the year).

The Applicant has observed that the current performance needs—typically different and contrasting with each other—appear unmeetable even through a tyre change, for example by selecting, according to a consolidated use, a pair of racing tyres and a pair of road tyres.

According to that observed by the Applicant, a recent trend indicates that users wish to find combined, in the tyres that equip super sport motor vehicles, driveability performances and performances in speed and extreme manoeuvres conditions on dry and/or hot surfaces together with driveability performances and gripping on wet or moist surfaces and/or in cold climate conditions or with non-optimal road surfaces, in addition to a increasingly high lifetime in order to reduce the tyre change frequency.

Meeting such contrasting needs with a single pair of tyres is a particularly challenging task—typically, each of the above-reported needs is confronted in a different way, by applying solutions suitable for the specific problem, but in contrast with the other solutions.

The Applicant has for example observed that in the tread compounds intended for high performance tyres (racing tyres) on dry surfaces and/or at high temperatures, considerable quantities of carbon black filler are used, while for tread compounds intended for use on wet surfaces and/or low temperatures, the selection of the fillers has typically tended towards so-called white fillers, such as for example silica and silicates.

In addition, rigid tyre structures—typically for use on racetracks where the tyres are deflated even several tenths of a bar with respect to the pressure indicated by the manufacturer, in order to have a greater footprint area so to suitably respond to extreme manoeuvres—do not seem in keeping with a road use in which, with the tyre inflated to the pressures advised by the manufacturer, comfort, grip and stress absorption on different road surfaces are requested.

The Applicant has however surprisingly found that it is possible to obtain a high performing tyre both on the racetrack and on the road, in different atmospheric and seasonal conditions, which is also durable with regard to kilometer distance travelled, by means of the use of a rigid carcass structure in combination with a particular tyre profile and with an elastomeric tread compound with a high content of white fillers.

This appears surprising since a tread obtained with elastomeric material with a high white filler content (such as silica, silicates etc.), typical for use on wet surfaces and in cold climates, typically rigid hence adapted for driving that is not particularly extreme, would not seem to be very suitable for combination with a rigid structure so as to provide sport driving performances.

The invention refers to a tyre for motor vehicles, comprising a carcass structure, a belt structure applied in a position radially external to the carcass structure, a tread band applied in a position that is radially external with respect to the belt structure wherein the tyre has a transverse curvature ratio of at least about 0.30. Said carcass structure comprises at least one carcass layer comprising textile reinforcement elements obtained by means of cords having, in a load/elongation diagram, an elastic response of at least 55 N at an elongation of about 2%. The tyre has at least one tread portion comprising a cured elastomeric material obtained by curing an elastomeric compound comprising 100 phr of at least one elastomeric diene polymer, from 30 to 130 phr of at least one reinforcement filler comprising at least 60% of an inorganic material selected from among silica, allumina, silicates, hydrotalcite, calcium carbonate, kaolin, titanium dioxide and their mixtures, from 1 to 35 phr of at least one resin.

The Applicant has observed that a combination of relatively rigid carcass structure, with a profile having a pronounced curvature and cured elastomeric material with high silica content in the presence of resins, allows a tyre to achieve high performances during sport driving characterised by extreme high speed manoeuvres and/or during sudden direction and grip changes during driving in different climate conditions and allows extending the lifetime of the tyre. The Applicant deems that one such improvement could be due to an improved interaction of the tyre with the cured elastomeric material with high silica and/or silicate content that composes the tread and that the latter, even if typically provided for driving on wet surfaces and in cold climates, combined with the abovementioned structure and the profile allows the tyre to achieve high performing operations even in extreme driving conditions on dry surfaces, without excessive increase of temperature.

The present invention can comprise one or more of the below-reported characteristics.

Preferably, the textile reinforcement elements can be composed of fibres of natural or synthetic origin, selected from among Rayon, Lyocell, polyesters (for example PEN, PET, PVA), aromatic polyamides (for example aramids such as Twaron®, Kevlar®), separately or mixed.

Preferably the fibrous material for obtaining the textile reinforcement elements of the carcass layer is selected from among Polyester, Rayon, Lyocell, Aromatic polyamides or a hybrid formed by combining yarns of two or more of the aforesaid materials.

Preferably said at least one reinforcement filler comprises at least 70% of an inorganic material selected from among silica, allumina, silicates, hydrotalcite, calcium carbonate, kaolin, titanium dioxide and their mixtures.

Preferably said at least one reinforcement filler comprises at least 90% of an inorganic material selected from among silica, allumina, silicates, hydrotalcite, calcium carbonate, kaolin, titanium dioxide and their mixtures.

Preferably said at least one tread portion is a crown portion arranged at the equatorial plane of the tyre.

Preferably said crown portion extends axially for at least 30% of the axial extension of the tread of the tyre.

Preferably said crown portion extends axially for at least 50% of the axial extension of the tread of the tyre.

Preferably said crown portion extends axially for at least 65% of the axial extension of the tread of the tyre.

Preferably said reinforcement cords have, in a load/elongation diagram, an elastic response not greater than about 120 N at an elongation of about 2%.

Preferably said reinforcement cords have, in a load/elongation diagram, an elastic response not greater than about 100 N at an elongation of about 2%.

According to the Applicant, the limitation of the rigidity of the carcass structure allows maintaining good or optimal road driving performances without substantially causing a reduction of the perceived comfort and an overly quick response during speed manoeuvres and gear changes.

Preferably the tyre has a ratio, between the radius of curvature in the shoulder area (also termed shoulder radius hereinbelow) and maximum width of the transverse or axial section, of at least 0.60.

Preferably the tyre has a ratio between the shoulder radius and the maximum width of the transverse section of at least 0.70.

According to the Applicant, high values of the ratio between the shoulder radius and the maximum section width (i.e. a flatter profile in the shoulder area) allow obtaining a high footprint area and hence support area by the tyre, even with the high camber angles that can be reached in sport driving.

The tread compounds according to the present invention comprise at least one elastomeric diene polymer (a1).

According to one embodiment, said at least one elastomeric diene polymer (a1) can for example be selected from among elastomeric diene polymers commonly used in the elastomeric compositions cross-linkable with sulfur (curing), which are particularly suitable for tyre production, i.e. from elastomeric polymers or copolymers with an unsaturated chain having a glass transition temperature (Tg) normally below 20° C., preferably in the range of 0° C. to −110° C. These polymers or copolymers can be of natural origin or they can be obtained by means of polymerisation in solution, polymerisation in emulsion or polymerisation in gaseous phase of one or more conjugated diolefins, optionally mixed with at least one comonomer selected from among monovinylarenes and/or polar comonomers.

For the tread compound, polybutadiene (BR) and/or styrene-butadiene (SBR) polymers can be preferably used, separately or mixed.

Alternatively, mixtures can be used comprising polyisoprene (natural or synthetic) and a styrene-butadiene (SBR) polymer.

Preferably styrene-butadiene (SBR) polymer can be present in the compounds of the present invention in a quantity that varies from about 1 to 100 phr, more preferably from 5 to 90 phr.

Preferably polybutadiene can be absent or included in the compounds of the present invention and in particular in the tread compound in a quantity from about 1 phr to 100 phr, preferably from about 1 phr to 80 phr, more preferably from about 5 to 50 phr.

Preferably, styrene-butadiene polymer can come from solution or emulsion, and comprises styrene generally in a quantity ranging from about 10 to 40%, preferably from about 15 to 30%.

Preferably, styrene-butadiene polymer can have low molecular weight, having an average molecular weight $Mn$ less than 50000 g/mol, preferably comprised between 1000 and 50000 g/mol.

As stated above, the elastomeric material of the tread band comprises at least one reinforcement filler present in a quantity generally comprised between 1 phr and 130 phr. The reinforcement filler can be selected from among hydroxides, oxides and oxide hydrates, salts and metal salt hydrates or their mixtures, and/or carbon black.

The reinforcement filler can preferably be selected from among silica, allumina, silicates, hydrotalcite, calcium carbonate, kaolin, titanium dioxide and their mixtures.

For some tread portions and for the compounds of other components of the tyre, the reinforcement filler can be carbon black on its own or added to the aforesaid inorganic materials (hydroxides, oxides and oxide hydrates, salts and metal salt hydrates or their mixtures).

The silica that can be used in the present invention can generally be a pyrogenic silica or, preferably, a precipitated silica, with a BET surface area (measured according to the ISO Standard 5794/1) comprised between 50 $m^2/g$ and 500 $m^2/g$, preferably between 70 $m^2/g$ and 200 $m^2/g$.

By "curvature ratio" of the tyre it is intended the ratio between the distance comprised between the radially most external point of the tread band and the maximum width of the transverse section of the tyre (also termed maximum chord) and the same maximum width of the transverse section of the tyre. The curvature ratio also identifies the so-called "transverse curvature" of the tyre.

By "maximum width of the transverse section" (or maximum chord) it is intended the maximum width of the tyre profile, in other words the size of the segment having as ends the two axially most external points of the tread profile;

By radius of curvature in the shoulder area or more simply shoulder radius, it is intended the radius that better approximates the actual profile of the tread in an axially more external angular sector (for example 30°) centred on the intersection between the line of the equatorial plane and the maximum chord of a half-profile of the tyre.

The term phr (acronym of "parts per hundred of rubbers") indicates parts by weight per 100 parts by weight of total elastomeric base. For the calculation of 100 parts of total elastomeric base, possible additives (such as extension oils) are not considered.

With regard to the measurement of the linear density and the tensile properties of the textile reinforcement elements, reference is made to the tests standardised by BISFA (Bureau International pour la Standardisation des Fibres Artificielles).

In particular:

for aramid fibres (AR):

BISFA—Testing methods for para-aramid fibre yarns, edition 2002

Determination of the linear density—Chapter 6

Determination of the tensile properties—Chapter 7—Test procedure—Paragraph 7.5—with initial pretensioning procedure.

For Rayon (RY) and Lyocell (LY):

BISFA Testing methods for viscose, cupro, acetate, triacetate and lyocell fibre yarns—edition 2007, Determination of the tensile properties—Chapter 7—Tension test conditions: Dry test in an oven—Table 7.1-Table 7.1—Test procedure—Paragraph 7.5—with test on samples under dry relaxation in an oven—subparagraph 7.5.2.4.

for Polyester (PET, PEN, PVA)

BISFA—Testing methods for polyester yarns—edition 2004

Determination of the tensile properties—Chapter 7—Procedure A

Preparation of laboratory samples: Preparation of samples under relaxation paragraph 7.4.1.1=>preparation of samples on collapsible distaff Preparation of laboratory samples and conducting the test: Manual test—paragraph 7.5.2.1=>c)

Start procedure=>e) pretensioning at the procedure start

The term "elastomeric polymer" is a term consolidated in the tyre field and is used in hundreds of patents and non-patent documents. By way of example, the book "Elastomeric polymer networks", Eugene Guth, published by Prentice Hall in 1992 can be mentioned. This term has for many years been part of the common technical language in the field and is generally employed for indicating a polymer with elastic properties, i.e. mainly a low Young's modulus.

BRIEF DESCRIPTION OF THE DRAWINGS

Further characteristics and advantages of the tyre of the present invention will be clearer from the following detailed description of preferred embodiments thereof, made with reference to the enclosed drawings. In such drawings.

DETAILED DESCRIPTION OF EMBODIMENTS OF THE INVENTION

Figure 1:
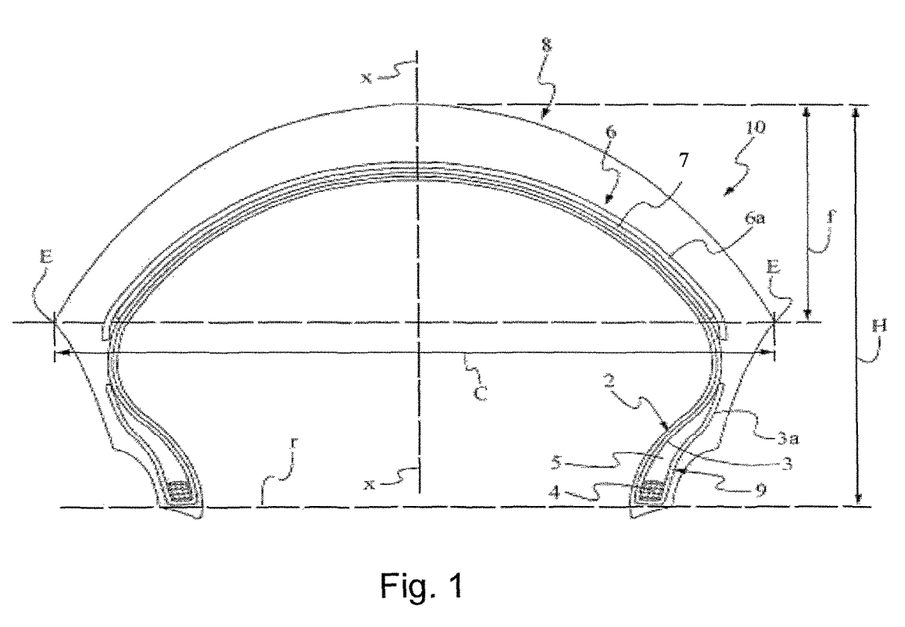
FIG. 1 schematically shows a radial section of a tyre for motor vehicles.

In FIG. 1, reference number 10 indicates overall a tyre for motor vehicle wheels. This is a tyre preferably intended to be used on a wheel of a motor vehicle for the "Super sport" segment.

In particular, the tyre 10 is a high performance tyre that can be intended for mounting on a "super sport" or "racing" motor vehicle wheel, i.e. motor vehicles with large-displacement engines (for example 600 $cm^3$ or greater), and/or high power (for example about 90-100 kw or greater) also used on the racetrack.

With high performance tyres for motor vehicle wheels, it is intended tyres capable of sustaining maximum speeds of at least about 210 km/h or supporting maximum loads of at least about 210 kg or a combination of both.

Associated with the tyre 10, an equatorial plane X-X and a rotation axis (not shown in the figure) are defined. A circumferential direction arranged according to the rotation sense of the tyre and an axial direction perpendicular to the equatorial plane X-X and/or parallel to the rotation axis are also defined.

With reference to FIG. 1, the tyre 10 comprises a carcass structure 2 formed by at least one carcass layer 3 comprising a plurality of reinforcement elements (cords).

The internal walls of the carcass structure 2 are typically covered with a seal layer, or so-called "liner", essentially constituted by a layer of air-impermeable elastomeric material, adapted to ensure the hermetic seal of the tyre itself once inflated.

The reinforcement elements, included in the carcass layer 3, preferably comprise textile cords made of fibrous material.

Such cords have, in a load/elongation diagram, an elastic response of at least 55 N at an elongation of about 2%. Preferably said reinforcement cords have, in a load/elongation diagram, an elastic response not greater than about 120 N at an elongation of about 2%. Still more preferably, said reinforcement cords have, in a load/elongation diagram, an elastic response not greater than about 100 N at an elongation of about 2%.

The fibrous material, used for manufacturing the cords, can be composed of fibres of natural or synthetic origin selected from among Rayon, Lyocell, polyesters (for example PEN, PET, PVA), aromatic polyamides (for example aramids such as Twaron®, Kevlar®), separately or mixed. More particularly, the fibrous material for obtaining the cords is preferably selected from among Polyester, Rayon, Lyocell, Aromatic polyamides or a hybrid formed by two or more of the aforesaid materials.

The cords are typically formed from one or more plies with elementary thread having a diameter comprised between 0.35 mm and 1.5 mm.

The count or linear density of the yarns or plies that form the cords or reinforcement elements can be expressed in decitex (dTex), i.e. mass expressed in grams of a thread or threadlike reinforcement element of 10000 m length.

For example:

RY (rayon) 1840/2 (48×48) identifies a cord formed by two yarns or plies of rayon fibre, each yarn or ply having a linear density or count of 1840 dTex (overall count of the cord equal to 3680 dtex). With "overall count" of a cord it is intended the sum of the linear densities or counts of the yarns or plies twisted together to form the cord. Each yarn or ply of the example is twisted on itself (48 twists/dm) and two or more yarns or plies are twisted together (48 twists/dm—preferably in opposite sense) in order to form a cord.

Preferably, each fibre yarn or ply used for the cords has a linear density or count greater than about 500 dtex.

Preferably, each fibre yarn or ply has a linear density or count less than about 4000 dtex.

Preferably, the overall linear density or overall count of the cords is comprised between 1220 dTex of a single cord 1220/1 dTex and 11040 dTex given by three cords—3680/3 dTex twisted together where the terms /1 or /3 represent the number of plies of the yarn twisted together in each construction.

Figure 3:
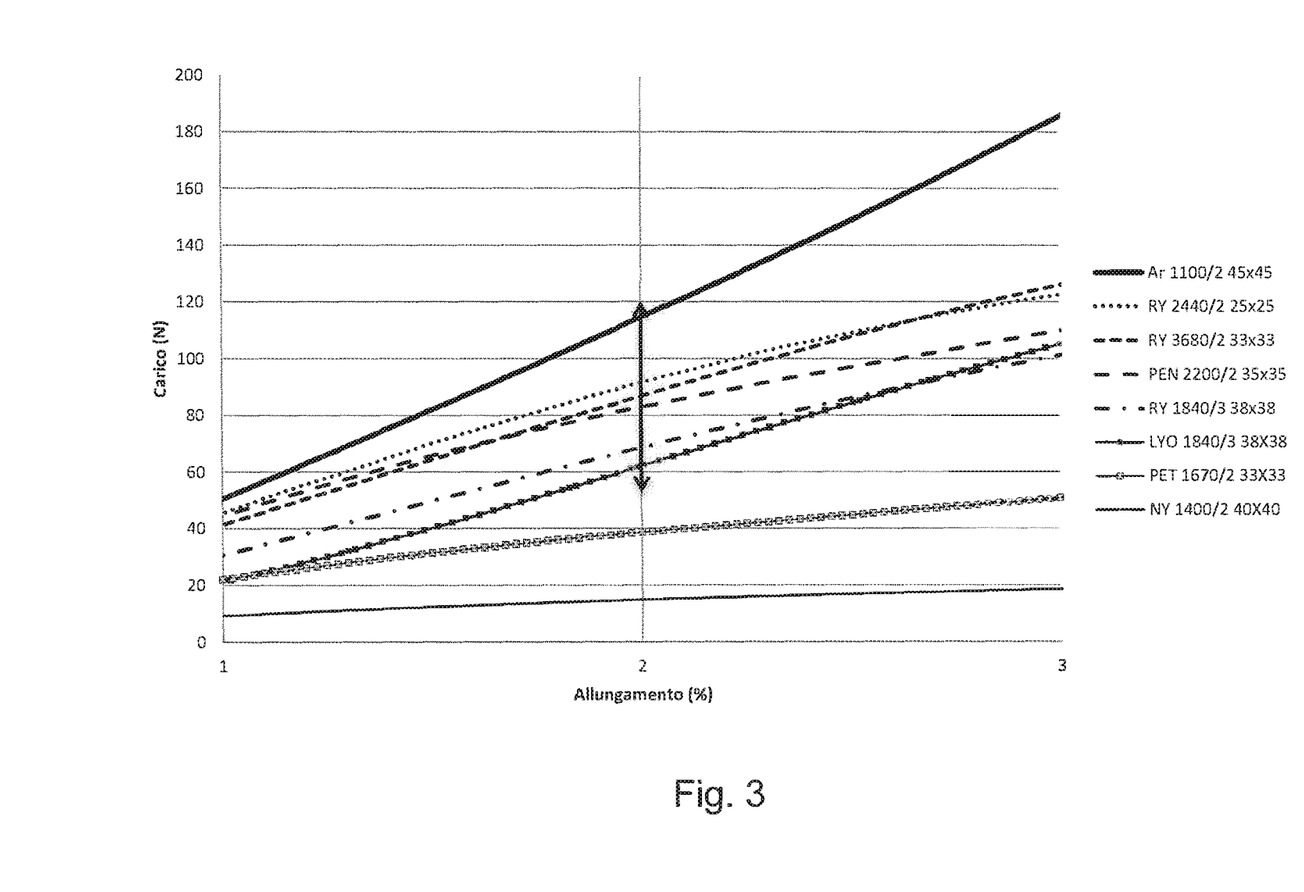
FIG. 3 shows a load elongation graph of several reinforcement elements for carcass layers.

Examples of counts used for obtaining the cords of the invention are the following:
  2200 dTex in the form of 1100/2 dTex
  2440 dTex in the form of 1220/2 dTex
  3680 dTex in the form of 1840/2 dTex
  4880 dTex in the form of 2440/2 dTex
  5520 dTex in the form of 1840/3 dTex
  7320 dTex in the form of 2440/3 dTex
  7360 dTex in the form of 3680/2 dTex In FIG. 3, the load elongation curves of the following cords are reported:
  AR 1100/2 45×45
  RY 3680/2 33×33
  RY 2440/2 25×25
  LYO 1840/3 38×38
  RY 1840/3 38×38
  PET 1670/2 33×33
  NY 1400/2 40×40
  PEN 2200/2 35×35

As can be observed, both the Nylon NY 1400/2 40×40 and the polyester PET 1670/2 33×33 tested have tensile characteristics less than the 55N limit at 2% elongation, which is deemed the minimum for obtaining a carcass structure that can be used for the purpose of the invention.

The twists imparted to the paired or coupled yarns can be in the same sense or in the opposite sense with respect to the twists imparted to the single yarns.

In order to obtain the cords, yarns or plies can be selected made of different materials and/or having different counts in order to form a yarn that is then twisted separately (on its own) or together with other yarns (hybrid cords).

Preferably, the at least one carcass layer is reinforced with cords arranged substantially parallel to each other, with a density greater than 60 cords/dm, preferably greater than 70 cords/dm, preferably less than 140 cords/dm.

From the elastic response at 2% of the reinforcement cords of the carcass layer or rubber-covered fabric, it is possible to extrapolate an overall elastic response on the layer by multiplying said elastic response at 2% of the cords by the density. Preferably the aforesaid value obtained for the rubber-covered fabric that forms the carcass layer is at least 6500 N/dm, preferably greater than 7000N/dm, preferably less than 14000 N/dm.

The reinforcement elements included in the at least one carcass layer 3 are preferably arranged radially, i.e. according to an angle comprised between 70° and 110°, more preferably between 80° and 100°, with respect to the circumferential direction.

The at least one carcass layer 3 is shaped according to a substantially toroidal configuration and is engaged, by means of its opposite circumferential edges 3a, with at least one annular reinforcement structure.

In particular, the opposite lateral edges 3a of the at least one carcass layer 3 can be turned up around the annular reinforcement structures, each comprising one or more metallic annular bead cores 4 and a tapered elastomeric filler 5 which occupies the space defined between the carcass layer 3 and the corresponding turned-up lateral edge 3a of the carcass layer 3.

The area of the tyre comprising the bead core 4 and the filler 5 forms the so-called bead 9 intended for anchoring the tyre on a corresponding mounting rim, not shown.

In a non-illustrated embodiment, the at least one carcass layer is obtained by means of approaching a plurality of strips made of elastomeric material reinforced by the aforesaid cords, and has its opposite lateral edges associated without turn-up with particular annular reinforcement structures provided with two annular inserts. An elastomeric material filler can be arranged in axially external position with respect to the first annular insert. A second annular insert can instead be arranged in axially external position with respect to the end of the carcass layer. Finally, in axially external position with respect to said second annular insert, and not necessarily in contact therewith, a further filler can be provided which completes the obtainment of the annular reinforcement structure.

Circumferentially applied on the carcass structure 2, in radially external position, is a belt structure 6 comprising at least one belt layer 6a typically formed by rubber-covered cords. Preferably, the layer 6a is obtained by means of cords arranged substantially parallel and side-by-side to form a plurality of coils. Such coils are substantially oriented according to the circumferential direction (typically with an angle between 0° and 5°), such direction normally being termed "zero degree" with reference to its lying position with respect to the circumferential direction of the tyre.

Preferably, the layer 6a typically termed "zero degree" can comprise side-by-side windings of a single cord, or of a strip-like element of rubber-covered fabric comprising axially side-by-side put cords.

The cords of the layer 6a are textile or metallic cords. Preferably such cords are metallic, made by means of steel wires with high carbon content, i.e. steel wires with a carbon content of at least 0.6-0.7%.

Preferably such metallic cords are high elongation (HE) cords.

For the purpose of improving the adhesion between the belt structure and the carcass structure, an adhesion layer 7 made of elastomeric material can be provided, interposed between the two aforesaid structures.

In a non-illustrated embodiment, the belt structure 6 can be constituted by at least two radially superimposed layers. The layers are arranged in a manner such that the cords of the first belt layer are oriented obliquely with respect to the circumferential direction of the tyre, while the cords of the second layer also have oblique orientation, but are substantially symmetrically crossed with respect to the cords of the first layer.

A tread band 8 is circumferentially superimposed on the belt structure; on such tread band 8, following a moulding operation executed simultaneously with the curing of the tyre, longitudinal and/or transverse recesses are typically obtained, arranged to define a desired tread pattern.

According to a preferred embodiment, the tread band 8 is obtained by means of an elastomeric material obtained from a compound comprising silica substantially as single filler (i.e. except for a presence of other fillers that is less than 2%, preferably less than 1% and still more preferably absent), preferably in a quantity from 70 phr to 130 phr.

Preferably the tread band 8 comprises an annular central portion with transverse extension comprised between 20% and 65% of the transverse extension of the tread band, comprising a reinforcing filler with 70% silica and the annular lateral and shoulder portions comprising substantially 100% silica.

In another preferred embodiment, the tread band comprises an elastomeric material comprising 100% silica as reinforcement filler for an annular central portion with extension up to 50%-70% of the transverse extension of the band and an elastomeric material comprising at least 80% of carbon black for the shoulder portions.

According to preferred embodiments, treads made of two radially superimposed portions (known as "cap and base") with the radially more external portion (cap) and the radially more internal (base) comprising different silica quantities, e.g. with the "base" made of a compound mainly filled with carbon black or with a silica quantity equal to or greater than 50-60% are also provided.

The tyre 10 can also comprise a pair of sidewalls laterally applied on opposite sides to said carcass structure 2.

The tyre 10 has a section height H measured, on the equatorial plane, between the top of the tread band and the fitting diameter, identified by the reference line r, passing through the beads of the tyre.

The tyre 10 also has a width of section C defined by the distance between the laterally opposite ends E of the tread itself, and a curvature defined by the particular value of the ratio between the distance f of the top of the tread from the line passing through the ends E of the tread itself, measured on the equatorial plane of the tyre, and the aforesaid width C. The ends E of the tread can be formed with an edge.

The tyres of the invention have a curvature ratio f/C of at least about 0.30.

In one embodiment, the tyre for motor vehicles of the invention is intended to be mounted on the rear wheel having chord size substantially comprised between 160 and 210 mm.

Preferably the distance (f) between the radially external point of the tread and the line passing through the laterally opposite ends of the tread itself of the rear tyre is substantially comprised between 50 and 80 mm. Preferably, for a rear tyre, the transverse curvature ratio (f/C) is substantially greater than 0.33, still more preferably comprised between 0.35 and 0.50. Preferably, the total/chord (H/C) height ratio is substantially comprised between 0.5 and 0.7.

In another embodiment, the tyre is intended to be mounted on the front wheel of a motor vehicle having chord size substantially comprised between 110 and 130 mm.

Preferably, the distance (f) between the radially external point of the tread and the line passing through the laterally opposite ends of the tread itself of the front tyre can be substantially comprised between 45 and 65 mm. Preferably, the transverse curvature/chord (f/C) ratio can be substantially comprised between 0.35 and 0.60, still more preferably between 0.40 and 0.50. Preferably, the (total height)/chord (H/C) ratio is substantially comprised between 0.6 and 0.9.

The tyres of the invention allow improved performances when they have sidewalls of considerable height, for example with values of the height sidewall ratio (H-f)/H greater than 0.35, more preferably greater than 0.4 for the rear tyre and greater than 0.5 for the front tyre.

Preferably the tyres of the invention have a ratio between the shoulder radius and the maximum width of the transverse section greater than 0.60.

Figure 2:
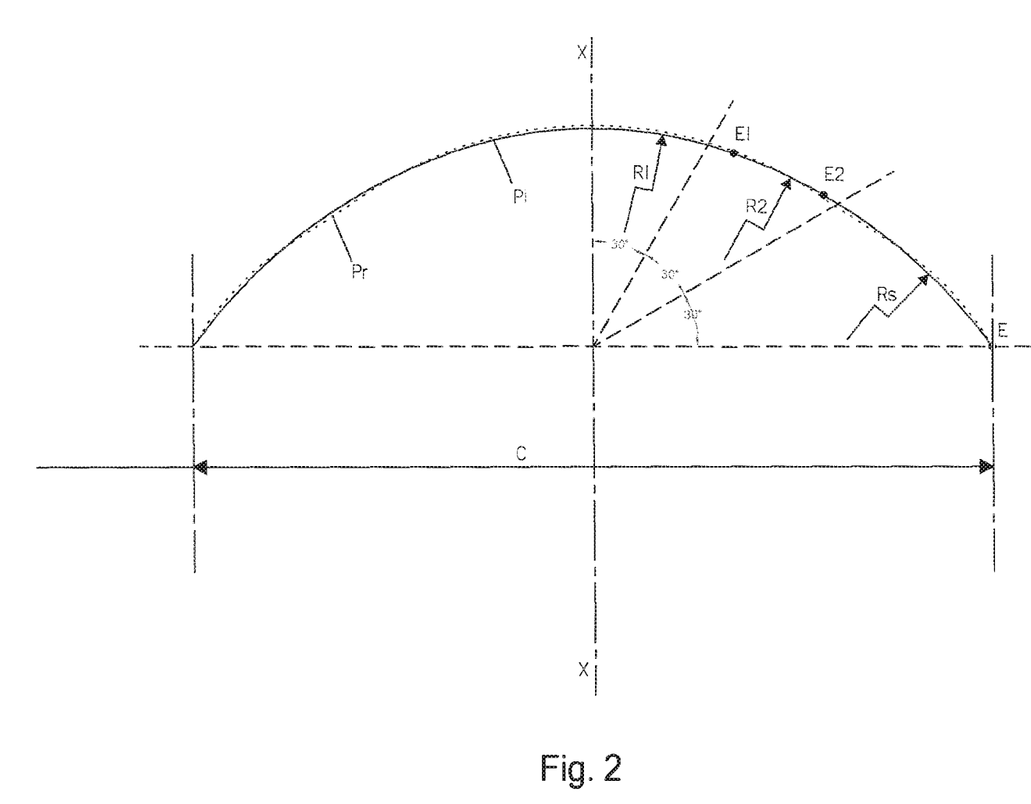
FIG. 2 shows, in schematic view, the curvature of the profile of a tyre for motor vehicles.

Shown in FIG. 2 is the trace of a tread profile Pr of a rear tyre and the interpolated profile Pi, on which the determination of the abovementioned shoulder radius can be based.

For the determination of the shoulder radius, the tyre is mounted on the reference ETRTO rim for the tyre measurement, it is inflated to nominal pressure (for example for the rear tyre, 2.9 bar), and the external profile of the tread is reported, ignoring the recesses, in 1:1 scale on paper in a manner such that it can be measured. The obtained profile Pr is divided into two symmetrical halves (half-profiles) with respect to an x-x axis (which represents the line of the equatorial plane) and one proceeds to interpolate with a sequence of arcs, typically from 1 to 3 arcs R1, R2, Rs. The number of arcs and the optimal sequence are those that allow minimising the deviation with respect to the actual profile, obtaining the interpolated profile Pi.

Exemplified in FIG. 2 is an interpolation that provides three arcs connected at points E1, E2 of the interpolated profile Pi. The shoulder radius is obtained as the radius of the arc Rs or average of the radii of the axially more external arcs Rs, R2 (arc determined on the half-profile subtended by an angle of 30° starting from the axial end of the half-profile), each being radii.

EXAMPLES

The Applicant conducted several comparative tests on tyres as described hereinbelow.

Tread compounds were first obtained according to the formulas reported in table 1.

A first compound C1 was prepared by using 100% carbon black as reinforcement filler. A second compound was prepared by using about 90% silica as main reinforcement filler.

TABLE 1

|  | C 1 (phr) | C 2 (phr) |
| --- | --- | --- |
| Cis-polybutadiene-BR | 27.3 | 27.3 |
| SBR * | 100.0* | 100.0* |
| Carbon black | 92.0 | 10.0 |
| Silica- |  | 80.0 |
| Silane |  | 6.4 |
| Oil | 20.0 | 20.0 |
| Alpha-methylstyrene resin | 18.0 | 18.0 |
| Zinc oxide | 3.0 | 3.0 |
| Stearic acid | 2.5 | 2.5 |
| 6PPD | 2.0 | 2.0 |
| Wax | 1 | 1 |
| Sulfur | 1.3 | 1.3 |
| Accelerant | 2.2 | 2.2 |
| DPG | 2.0 | 2.0 |

* polymer extended with 37.5 phr of oil for every 100 phr of dry elastomeric polymer (100 phr of extended oil SBR equivalent to 72.7 phr of Styrene Butadiene elastomer)
Cis-polybutadiene-BR: Europrene Neocis ® BR60 (Enichem elastomeri Italia) polybutadiene rubber
SBR: Styrene butadiene rubber extended oil copolymer, functionalised with siloxane, Dow Chemical Company with Tg = −23° C.
Carbon black: Carbon black N234 (ASTM grade)
Silica: ZEOSIL ® 1165 MP Rhodia
Silane: Si69—Degussa Silane
Oil: TDAE oil (Vivatec 500 ®)—H&R group
Methylstyrene resin: Methylstyrene resin (kristalex ® F85—Eastman Chemical Company)
Zinc oxide: industrial grade ZnO (Rhein Chemie)
Stearic acid: (Undesa)
6PPD: 1,3 dimethylbutyl-N-phenylparaphenylenediamine (Santoflex ® 6PPD Eastman Chemical Company)
Wax: Microcrystalline wax (Repsol)
Accelerant: N-Cyclohexyl-2-benzothiazyl sulfenamide (Vulcacit CZ, Bayer)
DPG: Diphenylguanidine (Perkacit ® DPG Eastman Chemical Company)

The compounds were used for obtaining the elastomeric material of the tread band of super sport tyres.

The Applicant, for the purpose of the desired performance improvement, took the rear wheel tyre Metzeler M5 180/55 ZR17 as the basis for the comparative drive test; such tyre was and still is a reference tyre held in high esteem by sport users. The decision to conduct the tests on rear tyres was considered particularly challenging since in sport driving such rear tyre is thermally stressed to a greater extent than the front tyre.

The first two groups of tyres (T1 and T2) respectively for rear wheels of super sport motor vehicles were therefore produced using, for the obtainment of the tread, respectively the abovementioned compounds C1 and C2 in tyres having the following structure:

shoulder radius/chord ratio=0.56;

Carcass structure with fabric carcass layers made with reinforcement cords in Rayon 1840/2, fabric density 120 cords/dm.

elastic response at 2% elongation of the reinforcement cords of the carcass layer equal to about 45 N per cord equivalent to about 5400 N/dm for the carcass layer.

A third group of tyres (T3) was obtained by using, for the tread, the compound C2 and the following tyre structure:

shoulder radius/chord ratio=0.72;

Carcass structure with fabric carcass layers made with reinforcement cords in Rayon 2440/2, fabric density 97 cords/dm.

elastic response at 2% elongation of the reinforcement cords of the carcass layer equal to about 90 N per cord equivalent to about 8730 N/dm for the carcass layer. Different test sessions were executed on a private racetrack, executing a series of manoeuvres for testing the driveability and the stability. The evaluation of the pilot is an average of the evaluations attributed in the various manoeuvres:

In a first test, tyres T1 and tyres T2 were compared. The inflation pressure was 2.9 bar, the temperature of the asphalt of the track 48° C. and the air temperature 29° C. The test was executed with a Suzuki GSX 1250F.

Table 2 summarises the score sheet of the tester. The results of these tests are expressed for the comparison of the tyres T2 with respect to the set of reference tyres T1 assumed as base. The values reproduced in the following table represent an average value from among those obtained in multiple test sessions (6 tests).

In the present case, the indication "=" indicates the level, considered high, of the set of tyres T1 taken as reference, the indication "+" indicates an improved performance with respect to the reference set.

On the other hand, a worsened performance with respect to the reference set is indicated with "−".

TABLE 2

| T. air = 29° C.<br>T. track = 48° C. | T1<br>Reference tyre | T2<br>Modified tyre |
|---|---|---|
| 1. DRIVE | | |
| | = | − |
| 2. STABILITY | | |
| | = | − |

The results reported in Table 1 clearly demonstrate that a tyre that is not modified according to the teachings of the invention, with tread obtained with an elastomeric material with high silica content in high temperature conditions offers poor performances and in particular cannot be compared with the high performance provided by the normal production tyre.

The Applicant has conducted another series of tests comparing rear tyres T1 with rear tyres T3.

In a second test, rear tyres T1 and rear tyres T3 were compared, obtained as described above. The inflation pressure was 2.9 bar; the track asphalt temperature 40° C., and the air temperature 29° C.

The test was executed with a Honda CBR 1000 R

Table 3 summarises the score sheet of the tester. The results of these tests are expressed for the comparison of the tyres T3 with respect to the set of reference tyres T1 assumed as base. The values reproduced in the following table represent an average value from among those obtained in multiple test sessions (6 tests).

In the present case, the indication "=" indicates the level, considered high, of the set of tyres T1 taken as reference, the indication "+" indicates an improved performance with respect to the reference set.

On the other hand, a worsened performance with respect to the reference set is indicated with "−".

TABLE 3

| T. air = 29° C.<br>T. air = 40° C. | T1<br>Reference tyre | T3<br>Invention tyre |
|---|---|---|
| 1. DRIVE | | |
| | = | + |
| 2. STABILITY | | |
| | = | + |

The tyre T3 according to the invention has shown an improved behaviour with respect to the already optimal comparison tyre T1, both with regard to the driveability and the stability in high temperature conditions, which shows that such tyre, typically adapted due to its high silica content for performances in cold climates and in driving on wet surfaces, also resulted particularly suitable for performances on dry surfaces and at high operation temperatures.

The invention claimed is:

1. A tyre for motorcycles, comprising
a carcass structure;
a belt structure applied in a position radially external to the carcass structure; and
a tread band applied in a radially external position with respect to the belt structure,
the tyre having a transverse curvature ratio of at least about 0.30 and a ratio, between a radius of curvature in a shoulder area and maximum width of a transverse section, of at least 0.60;
said carcass structure comprising at least one carcass layer comprising textile reinforcement elements made by means of cords having, in a load/elongation diagram, an elastic response of at least 55 N and not greater than about 120 N at an elongation of about 2%; and
the tyre having at least one tread portion comprising a cured elastomeric material obtained by curing an elastomeric compound comprising 100 phr of at least one elastomeric polymer, from 30 to 130 phr of at least one reinforcement filler comprising at least 60% of an inorganic material selected from silica, alumina, silicates, hydrotalcite, calcium carbonate, kaolin, titanium dioxide and mixtures thereof, and from 1 to 35 phr of at least one resin.

2. The tyre for motorcycles as claimed in claim 1, wherein the textile reinforcement elements comprise fibres of natural or synthetic origin, selected from rayon, lyocell, polyesters, aromatic polyamides, separately or mixed.

3. The tyre for motorcycles as claimed in claim 2, wherein the polyester is selected from PEN, PET and PVA.

4. The tyre for motorcycles as claimed in claim 2, wherein the aromatic polyamide is an aramid.

5. The tyre for motorcycles as claimed in claim 1, wherein fibrous material for obtaining the textile reinforcement elements of the carcass layer is selected from polyester, rayon, lyocell, aromatic polyamides or a hybrid formed by combining yarns of two or more of said fibrous materials.

6. The tyre for motorcycles as claimed in claim 1, wherein the overall linear density or overall count of the cords is between 1220 dTex and 11040 dTex.

7. The tyre for motorcycles as claimed in claim 1, wherein said at least one reinforcement filler comprises at least 70% of an inorganic material selected from silica, alumina, silicates, hydrotalcite, calcium carbonate, kaolin, titanium dioxide and mixtures thereof.

8. The tyre for motorcycles as claimed in claim 1, wherein said at least one reinforcement filler comprises at least 90% of an inorganic material selected from silica, alumina, silicates, hydrotalcite, calcium carbonate, kaolin, titanium dioxide and mixtures thereof.

9. The tyre for motorcycles as claimed in claim 1, wherein said at least one tread portion is a crown portion arranged at an equatorial plane of the tyre.

10. The tyre for motorcycles as claimed in claim 9, wherein said crown portion extends axially for at least 30% of an axial extension of the tyre tread.

11. The tyre for motorcycles as claimed in claim 9, wherein said crown portion extends axially for at least 50% of an axial extension of a tyre tread.

12. The tyre for motorcycles as claimed in claim 9, wherein said crown portion extends axially for at least 65% of an axial extension of a tyre tread.

13. The tyre for motorcycles as claimed in claim 1, wherein said reinforcement cords have, in a load/elongation diagram, an elastic response not greater than about 100 N at an elongation of about 2%.

14. The tyre for motorcycles as claimed in claim 1, wherein a radially most external layer of the carcass structure extends at a crown of the tyre from a equatorial plane to the axial ends of the tread band.

15. The tyre for motorcycles as claimed in claim 1, wherein the tyre has a ratio, between a radius of curvature in a shoulder area and maximum width of a transverse section, of at least 0.70.

* * * * *